United States Patent
Remery et al.

(10) Patent No.: US 7,240,034 B1
(45) Date of Patent: Jul. 3, 2007

(54) METHOD FOR SECURE ELECTRONIC TRANSACTION AND CORRESPONDING SYSTEM

(75) Inventors: Patrick Remery, Caen (FR); Jacques Traore, Flors (FR)

(73) Assignee: France Telecom, Paris (FR)

(*) Notice: Subject to any disclaimer, the term of this patent is extended or adjusted under 35 U.S.C. 154(b) by 759 days.

(21) Appl. No.: 10/111,062

(22) PCT Filed: Oct. 25, 2000

(86) PCT No.: PCT/FR00/02964

§ 371 (c)(1),
(2), (4) Date: Apr. 18, 2002

(87) PCT Pub. No.: WO01/31596

PCT Pub. Date: May 3, 2001

(30) Foreign Application Priority Data

Oct. 26, 1999 (FR) .................................. 99 13343

(51) Int. Cl.
*G06F 17/60* (2006.01)
(52) U.S. Cl. .................. 705/67; 705/1; 705/17; 705/39; 705/64; 235/380
(58) Field of Classification Search ............ 705/1, 705/67, 17, 39, 69; 235/380
See application file for complete search history.

(56) References Cited

U.S. PATENT DOCUMENTS 4,500,750 A * 2/1985 Elander et al. ............... 705/72
5,761,309 A * 6/1998 Ohashi et al. ............... 713/156
5,930,777 A * 7/1999 Barber ......................... 705/40
6,092,202 A * 7/2000 Veil et al. ...................... 726/27
6,332,133 B1 * 12/2001 Takayama ..................... 705/39
6,401,206 B1 * 6/2002 Khan et al. .................. 713/176

FOREIGN PATENT DOCUMENTS

| DE | 41 19 924 A | 12/1992 |
| DE | 197 18 547 A1 | 11/1998 |
| EP | 0 231 702 | 8/1987 |
| EP | 0 496 656 A1 | 7/1992 |
| EP | 0 588 339 A2 | 3/1994 |
| EP | 0 621 570 A1 | 10/1994 |
| EP | 0 671 712 A1 | 9/1995 |
| JP | 1041767 * | 9/1999 |
| WO | WO 91/16691 | 10/1991 |

OTHER PUBLICATIONS

Contactless technology security issues, Dr. Helena Handschuh, Apr. 2004.*

* cited by examiner

*Primary Examiner*—Andrew J. Fischer
*Assistant Examiner*—John Winter
(74) *Attorney, Agent, or Firm*—Pearne & Gordon LLP

(57) ABSTRACT

The transaction is made between an object and a terminal. According to the invention, an authentication value is inserted in the object which is a digital signature appearing on an identifier of the object. Each object also has a diversified key created from a base key diversified by the identifier. The terminal can thus authenticate the identifier and check that the debit has actually been made.

Application to electronic payment.

8 Claims, 1 Drawing Sheet

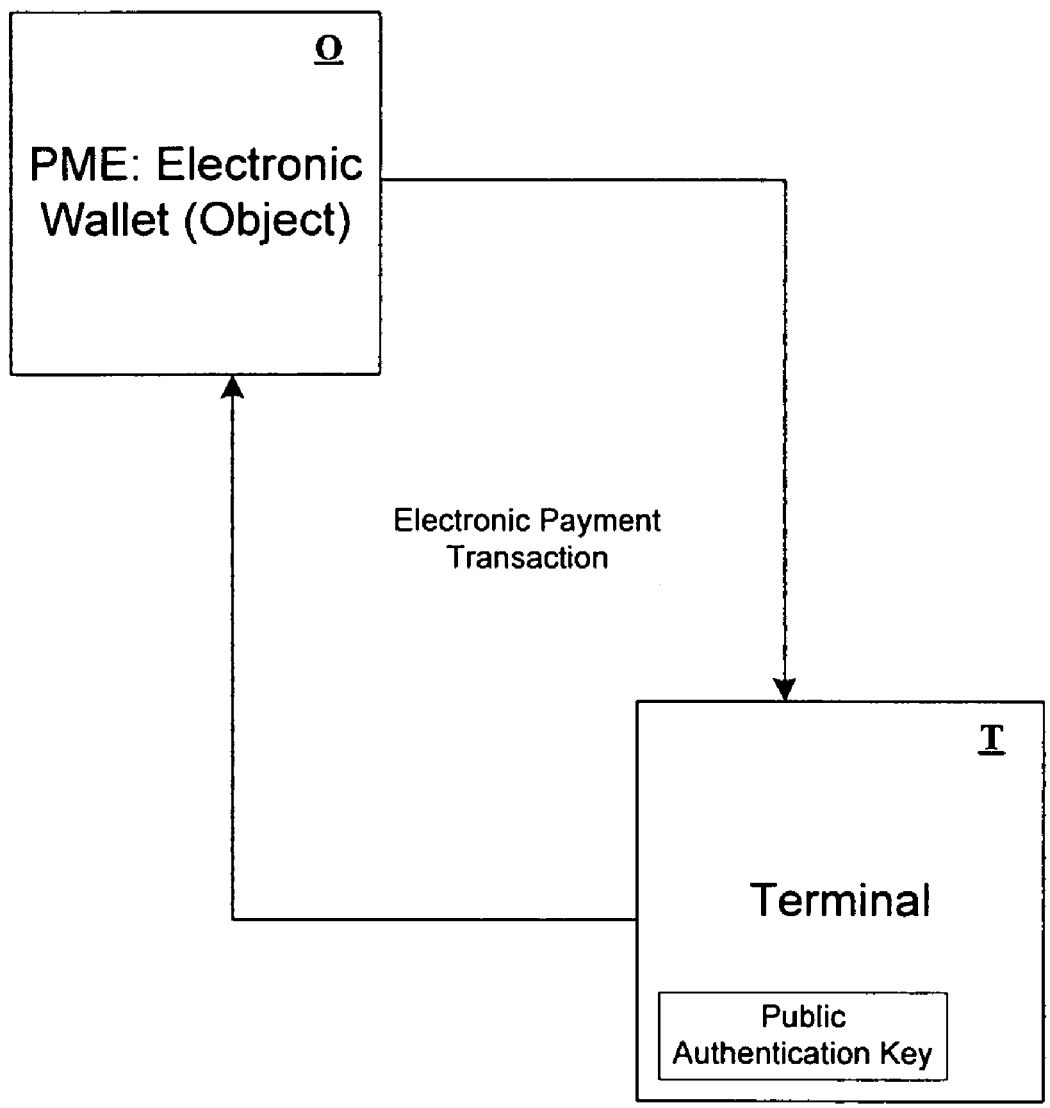
Figure

METHOD FOR SECURE ELECTRONIC TRANSACTION AND CORRESPONDING SYSTEM

TECHNICAL DOMAIN

This invention relates to a secure electronic transaction process and a corresponding system.

The invention is particularly applicable in electronic payment. It then uses a support called an electronic wallet that may be the same size as a credit card, with or without contact. But any other object or support could be used (watch, mobile telephone, etc.).

STATE OF PRIOR ART

The electronic wallet is a payment means intended for small transactions, frequently carried out remotely. For example it may apply to transactions in sectors such as automatic distribution (drinks, newspapers, etc.), public transport (metro, bus, etc.), communication networks (mobile telephone, public phone, internet, etc.), broadcasting of pay television programs (decoder, etc.).

These transactions are frequently made secure using conventional computer security techniques based on cryptographic functions used to calculate and verify the proof that the electronic wallet has been debited.

Symmetric type cryptographic algorithms are widely used, particularly for card components, since they are easy to implement.

The same secret key must be shared between the electronic wallet that produces the proof of the debit and the terminal that verifies this proof. Since the terminal cannot memorize the secret keys of all electronic wallets, it actually has only one base key which is the mother of all daughter keys (also called diversified keys) input into the electronic wallets.

Therefore, the same key must be known to all terminals, which can cause security problems. One known solution consists of multiplying the number of base keys, each electronic wallet having the daughter keys of the different base keys which are dispersed at random in the terminals. However, the limited capacity of component memories used in electronic wallets (a few kbytes) makes it impossible to store a large number of keys. For example, if the system comprises about ten base keys, discovery of a single key would weaken the security by one tenth.

The purpose of this invention is to overcome these disadvantages.

SUMMARY OF THE INVENTION

A secure electronic transaction process between an electronic wallet (O) to be debited by a certain amount (M) and a terminal (T) that can control this debit and check that the debit has actually been made, and the system for performing this process.

BRIEF DESCRIPTION OF THE DRAWINGS

The FIGURE shows a block-diagram of a system for performing the process of the invention according to one embodiment of the invention.

DESCRIPTION OF THE INVENTION

The process according to the invention consists of combining provisions related to cryptography with a secret key and provisions related to public key cryptography. For provisions related to public key cryptography, the invention uses an authentication value that is a digital signature applicable to an identifier related to the object to be debited. For example, this identifier may be the identity of the object, which can be used to calculate the daughter key. Other information, for example such as the validity start and end dates of the object, may be associated with the identity.

The authentication value and the daughter key (or the diversified key) are calculated and input into the objects by the authority that manages them, before any transaction, when the supports are personalized.

The authentication value is read in the object and is verified, in addition to the proof of the debit, for each transaction by the terminal, which has the public key corresponding to the private key used to produce the authentication value. The proof of debit will only be recognized if the diversifier is authenticated using the authentication value, and if it can be used to check the cryptogram of the proof of debit calculated by the object, after diversification of the base key.

If one of the base keys were discovered, the system would not be compromised as a result since it would also be necessary to extract a large number of authentication values from the different objects. Furthermore, introducing a fraudulent object into the system would require that an authentication value for this new object would be obtained. However, this value cannot be obtained without knowledge of the private key produced by the authority managing the objects. Therefore a massive fraud would require knowledge of the private key of the sender of the objects, in addition to knowledge of the base key.

Therefore, the invention has a "hybrid" nature providing an attractive compromise between performances (speed of execution) and security. This hybrid solution provides the advantages of both types of cryptographs but without their disadvantages; for real time transactions, all that is considered is the verification of the authentication value with the public key, since this verification is done more quickly than the calculation of this authentication value, that is only made once when the card is created and never afterwards during the transactions. In a way, it means adding a second public key authentication in addition to a secret key authentication. This may be referred to as "over security" which is not trivial for a subject (electronic wallets) in which performances are a strong constraint. This over security does not excessively constrain performances of the system, such that it is possible to talk about an optimum solution in terms of security and performances.

More precisely, the purpose of the invention is a secure electronic transaction process between an object (O) to be debited by a certain amount (M) and a terminal (T) that can control this debit and verify that the debit has actually been made, this process being characterized in that:

A) before any transaction:
  for each object defined by a certain identifier (i), an authentication value (VA) is calculated which is a digital signature applicable to an identifier of the object (i), this signature being produced using a private key ($S_{AUT}$) and can be checked from a public key ($P_{AUT}$) and this authentication value (VA) is then inserted into the object (O), the public authentication key ($P_{AUT}$) is input into each terminal (T), for each object (O), a diversified key ($k_i$) is determined from a base key (KM) by applying a diversification algorithm ($f_{KM}$) to the identifier (i) of the object using the base key, and this diversified key ($k_i$) is input into the object (O), B) for each transaction:

the object to be debited (O) sends its identifier (i) to the terminal (T) together with the authentication value (VA), the terminal (T) verifies this signature (VA), using the public key ($P_{AUT}$), the terminal (T) sends the amount and parameters of the transaction (M, j, n) to the object (O), the object (O) is debited by the said amount (M) and calculates a proof of this debit using a cryptographic function ($F_{ki}$) with the diversified key ($k_i$) as a secret key applied to the amount (M) and to the parameters of the transaction and sends this proof ($F_{ki}$ (M, j, n)) to the terminal (T), the terminal (T) calculates the diversified key of the object ($k_i$) using a cryptographic function ($f_{KM}$) using the base key (KM) as a secret key and applied to the identifier (i) of the object (O) ($k_i = f_{KM}(i)$) and verifies the proof of the debit ($F_{ki}$(M, j, n)) using this diversified key.

Preferably, in particular the identifier (i) used to calculate the authentication value (VA) comprises an identification number and possibly a validity period (start and/or end).

In one particular application, the object is an electronic wallet type support, the transaction being an electronic payment.

Another purpose of the patent application is a secure electronic transaction system comprising an object to be debited by a certain amount and a terminal that can control this debit and check that this debit has actually been made, this system being characterized in that:

each object is defined by a given identifier, and contains an authentication value that is a digital signature applicable to the object identifier, this signature being produced using a private key and can be checked using a public key, each terminal contains the public authentication key, each object contains a diversified key obtained from a base key by applying a diversification algorithm to the object identifier, using the base key, the object to be debited contains means for transmitting its identifier and the authentication value to the terminal, the terminal contains means capable of making a cryptographic calculation applied to the authentication value using the public authentication key, the terminal contains means capable of transmitting the transaction amount and parameters to the object, the object contains means capable of debiting the object by the said amount and calculating proof of this debit by a cryptographic function with its diversified key as the secret key and applied to the transaction amount and parameters, and transmitting this proof to the terminal, the terminal contains means capable of calculating the diversified key of the object by a cryptographic function using the base key as a secret key applied to the object identifier and verifying the proof of the debit using this diversified key.

DESCRIPTION OF PARTICULAR EMBODIMENTS

In the following description, it will be assumed that the object participating in the transaction is an electronic wallet, the transaction then being an electronic payment. But this example is in no way limitative. The invention could also be used to debit loyalty points, telephone units, etc.

The electronic wallet is denoted "PME" and the terminal is denoted "T". Furthermore:

i is the PME identifier (identity, validity start and end dates, etc.)

VA is the authentication value; VA is a digital signature calculated when the card is personalized, from a private key $S_{AUT}$, which is the private key of the authority managing PMEs, $P_{AUT}$ is the public key of the authority; this key is inserted into terminals to authenticate the identities of PMEs; therefore, in all cases VA=$S_{AUT}$ (i) and $P_{AUT}$ (VA, i)=yes, F, f are two cryptographic functions with secret keys, j is the terminal identifier, n is an anti-replay element chosen by the terminal, M is the amount of the transaction, KM is a base key; $k_i$ is the diversified key of the PME with identifier i.

The following diagram illustrates one embodiment of the process according to the invention. The arrows indicate data transfers between the terminal T and the PME.

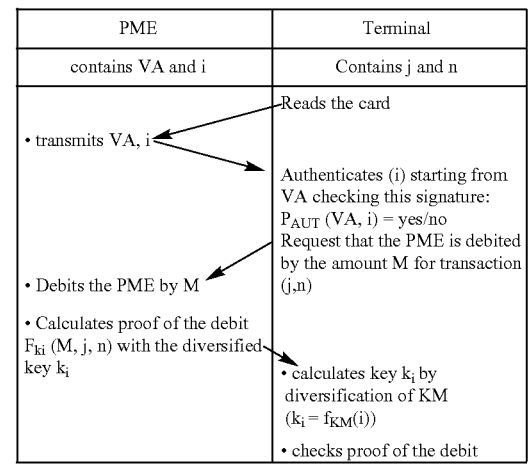

The invention claimed is:

1. A secure electronic transaction process between an electronic wallet to be debited by a certain amount and a terminal that can control this debit and check that the debit has actually been made, the process comprising the steps of:

A) before any transaction, initializing the electronic wallet and terminal to support secure transactions between the electronic wallet and the terminal by performing the steps of:

a management authority providing a public key and a private key pair;

providing a base key different from said public key and private key pair;

providing a unique identifier (i) for the electronic wallet;

for the electronic wallet defined by the identifier (i), the management authority calculating an authentication value which is a digital signature applicable to the identifier (i), the signature being produced using the private key and checked using the public key;

inserting the authentication value into the electronic wallet for storing in the electronic wallet to support the secure transactions between the electronic wallet and the terminal, inputting the public key into the terminal, the management authority calculating a diversified key from the base key by applying a diversification algorithm to the identifier (i) of the electronic wallet using the base key, and inputting the diversified key into the electronic wallet for storing in the electronic wallet to support the secure transactions between the electronic wallet and the terminal, B) for each transaction between the electronic wallet and the terminal:

sending the identifier (i) of the electronic wallet to the terminal together with the authentication value, the terminal validating the authentication value using the public key to validate the electronic wallet, the terminal sending the amount and parameters of the transaction to the electronic wallet, debiting the electronic wallet by the amount, the electronic wallet calculating a proof of the debit using a cryptographic function with the diversified key utilized as a secret key applied to the amount and to the parameters of the transaction, transmitting the proof to the terminal, the terminal separately calculating the diversified key of the electronic wallet using the diversification algorithm and using the base key as a secret key applied to the identifier (i) of the electronic wallet, and verifying the proof of the debit using the calculated diversified key.

2. The process according to claim 1, in which the identifier (i) used to calculate the authentication value comprises an identification number and a validity period.

3. The process according to claim 1, in which the transaction is an electronic payment.

4. A secure electronic transaction system comprising: an electronic wallet to be debited by a certain amount; a management authority; and a terminal that can control this debit and check that this debit has actually been made, wherein a public key and a private key pair are provided by the management authority for use in generating an authentication value, a base key is provided by the management authority for use in the management authority generating a diversification key using a diversification algorithm and the base key on the identifier (i), the electronic wallet is defined by a unique identifier (i), wherein the management authority calculating an authentication value that is a digital signature applicable to the identifier (i) of the electronic wallet, this signature being produced using the private key and checked using the public key, said authentication value being stored in the electronic wallet, and the authority provides the terminal with the public key, wherein the electronic wallet further storing the diversified key, and wherein the electronic wallet also includes means for transmitting the identifier (i) and the authentication value to the terminal, and further wherein the terminal includes:

means for validating the authentication value using the public key to validate the electronic wallet, and means for transmitting the transaction amount and parameters to the electronic wallet, and further wherein the electronic wallet further includes:

means for debiting the electronic wallet by the said amount, means for calculating proof of this debit by using a cryptographic function with the diversified key as the secret key and applied to the transaction amount and the parameters, and means for transmitting this proof to the terminal, wherein the terminal further includes means for separately calculating the diversified key of the object using the diversification algorithm and using the base key as a secret key applied to the identifier (i) of the electronic wallet and verifying the proof of the debit using this calculated diversified key.

5. A process for providing secure transactions between a plurality of electronic wallets and at least one terminal, said process comprising the steps of:

providing a management authority having a private authentication key and a base key different from said authentication key, the management authority producing a public authentication key corresponding to said private authentication key, personalizing the electronic wallets by performing the steps of:

providing a different identifier for each one of said electronic wallets, providing the identifiers of the electronic wallets to the management authority, the management authority processing each said identifier using the private authentication key to produce a different authentication value corresponding to each said identification value, for each one of the electronic wallets, storing the authentication value corresponding to the unique identifier of the one of the electronic wallets for acting as a digital signature for the one of the electronic wallets, the management authority using a diversification algorithm on each said identifier using the base key to produce a different diversified key corresponding to each said identifier, and for each one of the electronic wallets, storing the diversified key corresponding to the unique identifier of the one of the electronic wallets for use in proving transactions occurring with the one of the electronic wallets;

the authority providing the public authentication key to the terminal;

the authority providing the base key to the terminal; and performing a transaction between any one of the electronic wallets and the terminal, after the personalization of said one of said electronic wallets, by performing the steps of:

sending the identifier of said one electronic wallet to the terminal, sending the authentication value stored in said one electronic wallet to the terminal, the terminal verifying said one electronic wallet by authenticating the identifier of said one electronic wallet by checking the authentication value against the received identifier using the public authentication key, the terminal sending parameters of the transaction to the electronic wallet, said parameters including a certain amount to debit from a value stored in the electronic wallet, debiting the value stored in the electronic wallet by the certain amount, said one electronic wallet calculating a proof of the debit using a cryptographic function with the diversified key of said one electronic wallet applied to at least some portion of said parameters, transmitting, from the electronic wallet, the proof of the debit to the terminal, the terminal separately calculating the diversified key using the base key, and the terminal verifying the proof of debit using the calculated diversified key.

6. The process according to claim 5, in which the identifier used to calculate the authentication value comprises an identification number and a validity period.

7. The process according to claim 5, in which the transaction is an electronic payment.

8. A system comprising: a management authority; at least one terminal; and a plurality of electronic wallets; wherein said system for providing secure transactions between any one of said electronic wallets and said terminal such that said management authority has a private authentication key and a base key different from said authentication key, and the management authority is adapted for managing a public authentication key corresponding to said private authentication key, said public authentication key and said base key being provided to said terminal, said system further comprising:

means for personalizing the electronic wallets, said means for personalizing including:

means for providing a different identifier for each one of said electronic wallets, means for providing the identifiers of the electronic wallets to the management authority, wherein the management authority processes each said identifier using the private authentication key to produce a different authentication value corresponding to each said identification value, means for storing, in each one of the electronic wallets, the authentication value corresponding to the unique identifier of the one of the electronic wallets for acting as a digital signature for the one of the electronic wallets, wherein the management authority uses a diversification algorithm on each said identifier using the base key to produce a different diversified key corresponding to each said identifier, and means for storing, for each one of the electronic wallets, the diversified key corresponding to the unique identifier of the one of the electronic wallets for use in proving transactions occurring with the one of the electronic wallets; and means for performing a transaction between any one of the electronic wallets and the terminal, after the personalization of said one of said electronic wallets, said means for performing a transaction including:

means for sending the identifier of said one electronic wallet to the terminal, means for sending the authentication value stored in said one electronic wallet to the terminal, wherein the terminal verifies said one electronic wallet by authenticating the identifier of said one electronic wallet by checking the authentication value against the received identifier using the public authentication key, and wherein the terminal sends parameters of the transaction to the electronic wallet, said parameters including a certain amount to debit from a value stored in the electronic wallet, and further wherein said one electronic wallet debits the value stored in the electronic wallet by the certain amount and calculates a proof of the debit using a cryptographic function with the diversified key of said one electronic wallet applied to at least some portion of said parameters, and means for transmitting, from the electronic wallet, the proof of the debit to the terminal, wherein the terminal separately calculates the diversified key using the base key, and further wherein the terminal verifies the proof of debit using the calculated diversified key.

* * * * *